Sept. 29, 1936. R. FARIES ET AL 2,055,860
SHIPPING CONTAINER
Original Filed Oct. 24, 1933
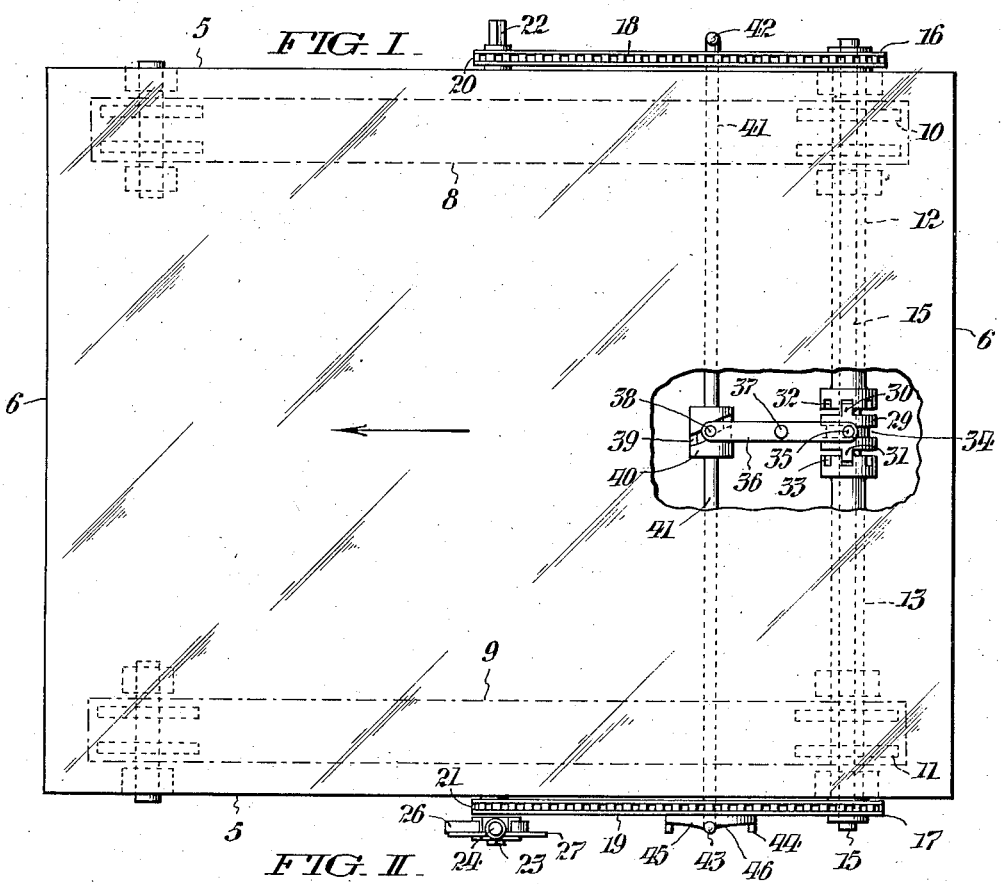
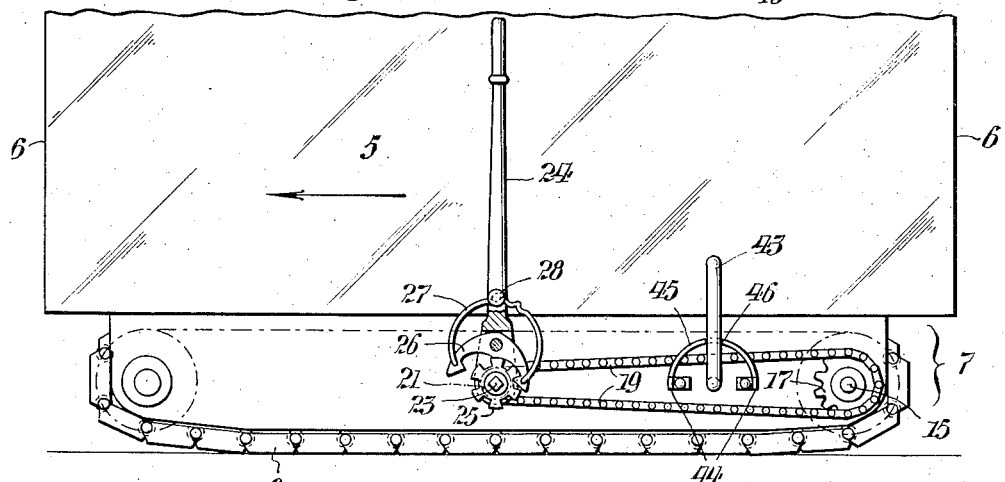
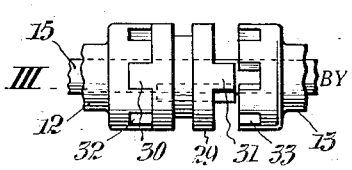
WITNESSES:
John C. Bugner
John A. Weidler
INVENTORS:
Robert Faries &
James B. McWilliams,
BY
ATTORNEYS.

Patented Sept. 29, 1936

2,055,860

UNITED STATES PATENT OFFICE 2,055,860

SHIPPING CONTAINER

Robert Faries, St. Davids, and James B. McWilliams, Pittsburgh, Pa.

Original application October 24, 1933, Serial No. 694,994. Divided and this application November 19, 1934, Serial No. 753,686

4 Claims. (Cl. 280—3)

This invention relates to shipping containers of the kind used by railroads in the transportation of freight in less-than-carload lots. Such containers are ordinarily proportioned and designed for close arrangement serially upon flat freight cars, and moreover adapted to be transferred sidewise from the cars to station platforms, motor trucks, trailers, etc., and vice versa.

The present application is a division of another application serial No. 694,994 filed by us on October 24, 1933, Patent No. 2,002,570, dated May 28, 1935, and is concerned with subject matter canceled from the latter application as the consequence of a requirement for division.

As in the previous application referred to, the present invention is directed, in the main, toward making possible the transfer of shipping containers between the cars and station platforms without necessitating the aid of power hoists or cranes, through incorporation with the containers of manually-operable propelling mechanism whereby either straightway or curvilinear progression may be affected.

A further object of our invention is to secure the above advantage in a manually-operable propelling mechanism which is compact, and which, moreover, is so organized and allocated that it does not preclude close arrangement of the containers on railway cars or trucks.

In the drawing, Fig. I is a plan view of a shipping container conveniently embodying our improved manually-operable propelling mechanism, a portion of the container body being broken out to expose important underlying details.

Fig. II is an end elevation of the container with the upper part broken away; and Fig. III is a detail view showing a clutch constituting a part of our invention.

The shipping container herein depicted may be of conventional construction with solid ends 5, and with sides 6 which are preferably provided with doors (not shown) for access to the interior of the container.

In accordance with our invention, the container is mounted upon a chassis 7 comprising two endless sprocket chain traction belts 8 and 9 which extend lengthwise of the opposite ends 5 of the container. The driving sprockets 10 and 11 for the traction belts 8 and 9 are respectively secured to component sections 12 and 13 of a split sleeve surrounding a shaft 15 which is suitably journalled in the frame of the chassis 7. Fast on the outer ends of the sleeve sections 12 and 13 are sprocket wheels 16 and 17 respectively, which are coordinated by chains 18 and 19 with sprocket pinions 20 and 21 on stub shafts 22 and 23 freely rotative in suitable bearings on the chassis 7 centrally of opposite ends 5 of the container. As shown, the projecting ends of the stub shafts 22 and 23 are fashioned to polygonal configuration for application thereto of an actuating handle 24, which, at its lower end, carries a single, freely-rotating ratchet wheel 25 with a polygonal axial opening. The actuating handle 24 is moreover fitted with a double-ended reversing pawl 26 to cooperate with the ratchet wheel 25, as well as with a notched bale spring 27 for the pawl, and a stop stud 28 to coact with the spring. Splined on the shaft 15, at the center, is a clutch collar 29 having teeth 30 and 31 at its opposite ends to mesh respectively with clutch teeth 32 and 33 on the contiguous ends of the sleeves 12 and 13. The collar 29 has a circumferential groove 34 engaged by a pin 35 at one end of a double arm lever 36 which is centrally fulcrumed at 37 on the chassis 7. A pin 38 at the other end of the lever 36 engages the spiral groove 39 of a rotary cam 40 on a rock shaft 41 whereof the ends are bent at right angles to provide control handles 42 and 43 which are accessible at opposite ends 5 of the container. The shaft 41 is limited to an 180° swing by contact of the control handle 43 with the end stops 44 of a spring segment 45 secured to the corresponding side of the chassis 7, said segment having a central notch 46 to yieldingly hold the handle 43 normally in upright position.

The manner of manipulating the container is as follows: The actuating handle 24 is placed on the polygonal end of one of the stub shafts 22, 23, for example, to the stub shaft 23, as shown. For straightaway progression of the container, the clutch control handle 43 at the corresponding end 5 of said container is turned to upright position as shown in Figs. I and II, so that the clutch collar 29 engages the clutch teeth 32 and 33 on both components 12 and 13 of the split sleeve. With the pawl 26 in the position shown in Fig. II, and by swinging the actuating handle 24, back and forth, the container will be progressed straight-away in the direction indicated by the arrows. Straight-away progression in the opposite direction is determined, on the other hand, by setting the pawl 26 so that its left hand end engages the ratchet wheel 25.

By turning the clutch control handle 43 rightward to horizontal position, the clutch collar 29 is shifted as shown in Fig. III into engagement with the teeth 30 of the sleeve 29 alone, so that only the traction belt 8 is operated when the handle 24 is actuated. Turning of the clutch control handle 43 leftward to horizontal position obviously results in shifting of the clutch collar 29 into engagement with the sleeve 13 only, so that the traction belt 9 is alone motivated upon actuation of the handle 24. In this way, the container can be progressed in a curvilinear path either to the right or to the left as desired.

It is to be particularly noted that the parts of the operating mechanism have but slight projection beyond the ends of the container. Accordingly, the containers of my invention can be closely arranged end to end in serial order upon flat railroad cars, trucks, drays, etc.

Having thus described our invention, we claim:

1. In a shipping container, a supporting chassis with a pair of laterally-spaced endless traction belts; a pair of aligned drive wheels for the traction belts; a shaft whereon the drive wheels are loosely mounted; means accessible at one side of the container and including a detachable member whereby the shaft may be manually rotated; and manual means controllable from the same side of the container whereby the drive wheels may be clutched to the shaft simultaneously or separately to determine straightaway progression of the container or curvilinear progression of the container in one direction or the other.

2. In a shipping container, a supporting chassis with a pair of laterally-spaced endless traction belts; a pair of aligned drive wheels for the traction belts; a split sleeve with aligned sections to which the drive wheels are respectively secured; a shaft extending axially through the split sleeve; means accessible at opposite sides of the container whereby the shaft may be rotated; a shiftable clutch collar splined to the medial portion of the shaft and having teeth at opposite ends adapted respectively to engage teeth on the contiguous ends of the sleeve sections; and means at opposite sides of the container whereby the clutch collar may be positioned to engage the contiguous ends of the sleeve sections simultaneously or separately to determine straightaway progression of the container, or curvilinear progression of the container in one direction or the other.

3. In a shipping container, a supporting chassis with a pair of laterally-spaced traction belts; a pair of aligned drive wheels for the traction belts; a split drive sleeve with aligned sections to which the drive wheels are respectively secured; a shaft extending axially through the split drive sleeve; means likewise accessible at opposite sides of the container whereby the shaft may be rotated manually; a shiftable clutch collar splined to the medial portion of the shaft and having teeth at opposite ends adapted to respectively engage teeth on the contiguous ends of the sleeve sections; a rock shaft with a rotary cam thereon; a centrally pivoted lever coordinating the rotary cam with the clutch collar; and handles at the ends of the rock shaft accessible at opposite sides of the container whereby the clutch collar may be positioned to engage the contiguous ends of the sleeve sections simultaneously or separately to determine straightaway progression of the container or curvilinear progression of the container in one direction or the other.

4. In a shipping container, a supporting chassis with a pair of laterally-spaced traction belts; a pair of aligned drive wheels for the traction belts; a split drive sleeve with aligned sections to which the drive wheels are respectively secured; a shaft extending axially through the split drive sleeve; sprocket chains coordinating sprocket wheels at the ends of the shaft with sprocket pinions on polygonal ended stub shafts at opposite sides of the container; a reversible ratchet actuating handle attachable to the polygonal ended stub shafts; a shiftable clutch collar splined to the medial portion of the shaft and having teeth at opposite ends adapted to respectively engage teeth on the contiguous ends of the sleeve section; and means also accessible at opposite sides of the container whereby the clutch collar may be positioned to engage the contiguous ends of the sleeve sections simultaneously or separately to determine straightaway progression of the container, or curvilinear progression of the container in one direction or the other.

ROBERT FARIES.
JAMES B. McWILLIAMS.